(12) United States Patent
Revankar et al.

(10) Patent No.: US 7,897,125 B1
(45) Date of Patent: Mar. 1, 2011

(54) SILICON TETRAFLUORIDE BYPRODUCT SEPARATION PROCESS

(76) Inventors: Vithal Revankar, Houston, TX (US); Sanjeev Lahoti, Houston, TX (US)

( * ) Notice: Subject to any disclaimer, the term of this patent is extended or adjusted under 35 U.S.C. 154(b) by 0 days.

(21) Appl. No.: 12/541,261

(22) Filed: Aug. 14, 2009

(51) Int. Cl.
*C01B 17/96* (2006.01)
*C01D 5/00* (2006.01)
*C01F 7/02* (2006.01)
*B01J 19/00* (2006.01)

(52) U.S. Cl. .................... 423/111; 423/122; 423/179; 423/184; 423/551; 423/625; 422/187; 23/302 T; 23/305 A

(58) Field of Classification Search ............... 423/111, 423/122, 179, 184, 551, 625; 422/187; 23/302 T, 23/305 A
See application file for complete search history.

(56) References Cited

U.S. PATENT DOCUMENTS 7,090,809 B2 * 8/2006 Harel et al. ............... 423/111

* cited by examiner

*Primary Examiner*—Timothy C Vanoy
(74) *Attorney, Agent, or Firm*—Baker & McKenzie LLP

(57) ABSTRACT

Embodiments of the invention provide a system and process for recovering useful compounds from a byproduct composition produced in a silicon tetrafluoride production process.

9 Claims, 6 Drawing Sheets

| Temp, °C | Byproduct Mixture composition | | | Dissolved Solids | | | Cake | | | | Gas | |
|---|---|---|---|---|---|---|---|---|---|---|---|---|
| | Original Feed Solids | | | | | | | | | | | |
| | $Na_2SO_4$ | $Al_2(SO_4)_3$ | $CaSO_4$ | $Na_2SO_4$ | $Al_2(SO_4)_3$ | $CaSO_4$ | $Na_2SO_4$ | $Al_2O_3$ | $CaSO_4$ | | $SO_3$/as $H_2SO_4$ | $SO_2$ |
| 700 | 27.69 | 66.71 | 5.58 | 27.69 | 7.99 | 0.01 | 0.01 | 17.5 | 5.58 | | 41.22 | 0.5 |
| 800 | 27.69 | 66.71 | 5.58 | 27.69 | 3.39 | 0.01 | 0.01 | 18.87 | 5.58 | | 44.45 | 0.1 |
| 900 | 27.69 | 66.71 | 5.58 | 27.69 | 0.44 | 0.01 | 0.01 | 19.75 | 5.58 | | 46.52 | 0.0001 |
| 950 | 27.69 | 66.71 | 5.58 | 27.69 | 0.001 | 0.01 | 0.01 | 19.88 | 5.58 | | 46.83 | 0.000055 |

FIG. 1

| Temp, °C | Byproduct Mixture composition | | | | | | | | | | |
|---|---|---|---|---|---|---|---|---|---|---|---|
| | Original Feed-Solids | | | Dissolved solids | | | Cake | | | Gas | |
| | Na$_2$SO$_4$ | Al$_2$(SO$_4$)$_3$ | CaSO$_4$ | Na$_2$SO$_4$ | Al$_2$(SO$_4$)$_3$ | CaSO$_4$ | Na$_2$SO$_4$ | Al$_2$O$_3$ | CaSO$_4$ | SO$_3$/as H$_2$SO$_4$ | SO$_2$ |
| 700 | 29.33 | 70.65 | 0.00 | 29.33 | 10.09 | 0.00 | 0.01 | 18.05 | 5.58 | 42.52 | 0.40 |
| 800 | 29.33 | 70.65 | 0.00 | 29.33 | 3.88 | 0.00 | 0.01 | 19.90 | 5.58 | 46.88 | 0.09 |
| 900 | 29.33 | 70.65 | 0.00 | 29.33 | 1.86 | 0.00 | 0.01 | 20.50 | 5.58 | 48.29 | 0.0001 |
| 950 | 29.33 | 70.65 | 0.00 | 29.33 | 0.001 | 0.00 | 0.01 | 21.06 | 5.58 | 49.60 | 0.0001 |

FIG. 5

SILICON TETRAFLUORIDE BYPRODUCT SEPARATION PROCESS

BACKGROUND OF THE INVENTION

Silicon tetrafluoride is an important chemical intermediate, useful for the production of valuable products, such as pure silica, silanes, pure silicon for solar cells, silicon nitride for ceramic products and fluorinated carbon-silicon polymers for materials for architectural uses. Other uses of silicon tetrafluoride include: treating dried concrete parts in order to provide a considerable improvement of their waterproofness and resistance to corrosion and abrasion; increasing the hydrophobic character of crystalline molecular sieves for producing orthosilicic acid esters; and as an etching medium for materials containing silicon in the semiconductor industry.

Known methods for producing silicon tetrafluoride, along with hydrogen fluoride, include reacting sulfuric acid with fluorspar, forming calcium sulfate as by-product. The reaction is endothermic and heat must be externally provided. Methods have been devised to improve heat transfer characteristics, yield and purity. Fluorosilicic acid, from phosphoric acid production, may also be used as feedstock to produce hydrofluoric acid and silicon tetrafluoride. In general, a stream of concentrated sulfuric acid, or oleum, and a concentrated aqueous solution of fluorosilicic acid are fed to a stirred reactor, producing hydrofluoric acid and silicon tetrafluoride in the form of a gas stream, which is washed by concentrated sulfuric acid. Also known is a process in which a stream of aqueous fluorosilicic acid is fed to an intermediate point between the head and the bottom of a vertical tower, and a stream of concentrated sulfuric acid is fed near the head of the tower. From the head of the tower, an overhead gas stream containing silicon tetrafluoride is recovered, and from the bottom of the tower a stream of diluted sulfuric acid is recovered. Yields of 95.4% to 98.5% are achieved, with a content of hydrofluoric acid in the silicon tetrafluoride, being lower than 0.1% by volume.

Other processes for manufacturing silicon tetrafluoride are based on elemental silicon. Elemental silicon and hydrogen fluoride are reacted at temperatures of about 250° C. or higher. The reaction may be conducted such that the gas product contains at least 0.02 volume % of the unreacted hydrogen fluoride. The process may be improved by contacting the gas product with elemental nickel at a temperature of 600° C. or higher.

A characteristic common to all these processes is constituted by the low yields of conversion of raw materials into silicon tetrafluoride and undesirable by-products. The impurities, in particular, compounds of fluorine, boron, phosphorus and arsenic elements which remain in the silicon tetrafluoride.

In US20100189621 entitled Improved Process of Silicon Tetrafluoride Gas Synthesis, the present inventors disclosed and claimed a process for producing silicon tetrafluoride with high conversion and purity from sources of fluoride with limited environmental impact. The disclosure of such application is incorporated herein in its entirety by reference. Specifically, that process produced silicon tetraflouride ($SiF_4$), from metal fluorides, silica and sulfuric acid.

The kiln discharge, which is a byproduct of the production of SiF4 according to the process described in US20100189621, is a mixture of sulfates of aluminum and sodium. In addition, this byproduct may further include sulfates of other metals, including sulfates of calcium, titanium and iron. For example, the following complex sulfates may be found in the kiln discharge: $NaAl(SO_4)_2 \cdot xH_2O$; $Ca_6Al(SO_4)_3(OH)_2 \cdot xH_2O$; $Na_aCa_bAl_c(SO_4)_d \cdot xH_2O$; $Na_2(SO_4)_2 \cdot xH_2O$; $Al_2(SO_4)_3 \cdot xH_2O$; and $Ca(SO_4)_x \cdot H_2O$, where a, b, c and d are integers. The composition of the byproduct depends on the starting component used for silicon tetrafluoride manufacturing. Depending upon the composition of the byproduct, the kiln discharge mixture components may be present as separated, individual components or as a compound mixture. For example, sodium-aluminum-calcium sulfate may be present as a single complex compound or as individual metal sulfates depending on the discharge conditions and reactor operation. Small amounts of unconverted feed materials (including silica, sulfuric acid and fluorides) are also expected to be present in the kiln discharge depending upon the type of operation and feed. There is a need for a process to separate out these byproduct compounds into valuable commercially viable commodity products in an environmentally sound manner.

SUMMARY OF THE INVENTION

Embodiments of the invention provide a process for recovering useful compounds from a byproduct composition produced in a silicon tetrafluoride production process. The process may include the steps of: calcining a byproduct composition comprising sodium sulfate and aluminum sulfate and forming a oxidized phase mixture comprising alumina fine solids, and sodium sulfate and a gaseous phase comprising sulfur trioxide; absorbing the gaseous sulfur trioxide in a mixture of sulfuric acid and water to produce oleum; cooling the oxidized phase mixture to produce a cooled solid phase mixture; mixing the solid phase mixture with water to produce a dissolved product comprising dissolved sodium sulfate and suspended alumina solids; filtering the dissolved product to obtain a cake comprising alumina and a sodium sulfate salt solution; crystallizing the sodium sulfate salt solution to produce steam condensate and a sludge; drying the cake to produce alumina solids; and drying the sludge to produce a dry sulfate salt. In some embodiments, the byproduct composition is calcined at a temperature between about 800° C. and about 950° C. In some embodiments, the solid phase mixture is mixed with water at a temperature between about 80° C. and about 90° C. The process may further include the step of recycling the oleum to a silicon tetrafluoride production process. In some embodiments, the byproduct composition may include calcium sulfate. In alternate embodiments, the dissolved product is filtered using a rotary filter or the byproduct composition may be pre-heated prior to calcination.

Another embodiment of the invention is a system for recovering alumina and sodium sulfate from a kiln byproduct in a silicon tetraflouride production process. The system includes: a hopper for receiving the kiln byproduct; a rotary feeder for transferring the kiln byproduct to a calcination kiln, the calcination kiln operable to temperatures of up to 1000° C.; a combustor for supplying heat to the calcination kiln; a product dissolving tank for receiving a cooled solid phase product from the calcination kiln; a rotary filter for separating suspended particles from an effluent of the product dissolving tank; a crystallizer for recovering sulfate salts from a liquid effluent of the rotary filter; a dryer for drying particulate recovered from the rotary filter; and an oleum scrubber for receiving a gaseous product of the calcination kiln.

BRIEF DESCRIPTION OF THE DRAWINGS

FIG. 1 is a Table illustrating the product composition of calcining a kiln byproduct according to a first embodiment of the invention.

FIG. 5 is a Table illustrating the product composition of calcining a kiln byproduct according to a second embodiment of the invention

DETAILED DESCRIPTION OF EMBODIMENTS OF THE INVENTION

Embodiments of the invention provide methods of recovering the byproduct mixture. In a first embodiment, the byproduct mixture is calcined at temperatures exceeding about 500° C., thereby oxidizing the aluminum compounds to form alumina. In preferred embodiments the calcination temperature is greater than about 800° C. In most preferred embodiments, the calcination temperature is greater than about 900° C. Likewise, titanium and iron sulfates present in the byproduct mixture are oxidized. However, other sulfates compounds remain unconverted, particularly sodium and calcium sulfates.

Example 1

A kiln byproduct mixture having the elemental composition shown in Table 1 was calcined in oxygen-enriched air for 25 minutes at several temperatures of about 700° C. and greater. As used herein, "oxygen-enriched air" means air having at least 18% oxygen.

TABLE 1

| By-product elemental composition (typical) | |
|---|---|
| O | 52.54% |
| S | 26.32% |
| Na | 8.97% |
| Al | 10.52% |
| Ca | 1.64% |

FIG. 1 tabulates the results of the calcination process. As can be seen in FIG. 1, the aluminum sulfate is significantly converted by calcination while the calcium sulfate and sodium sulfate concentrations are unaffected.

Figure 2:
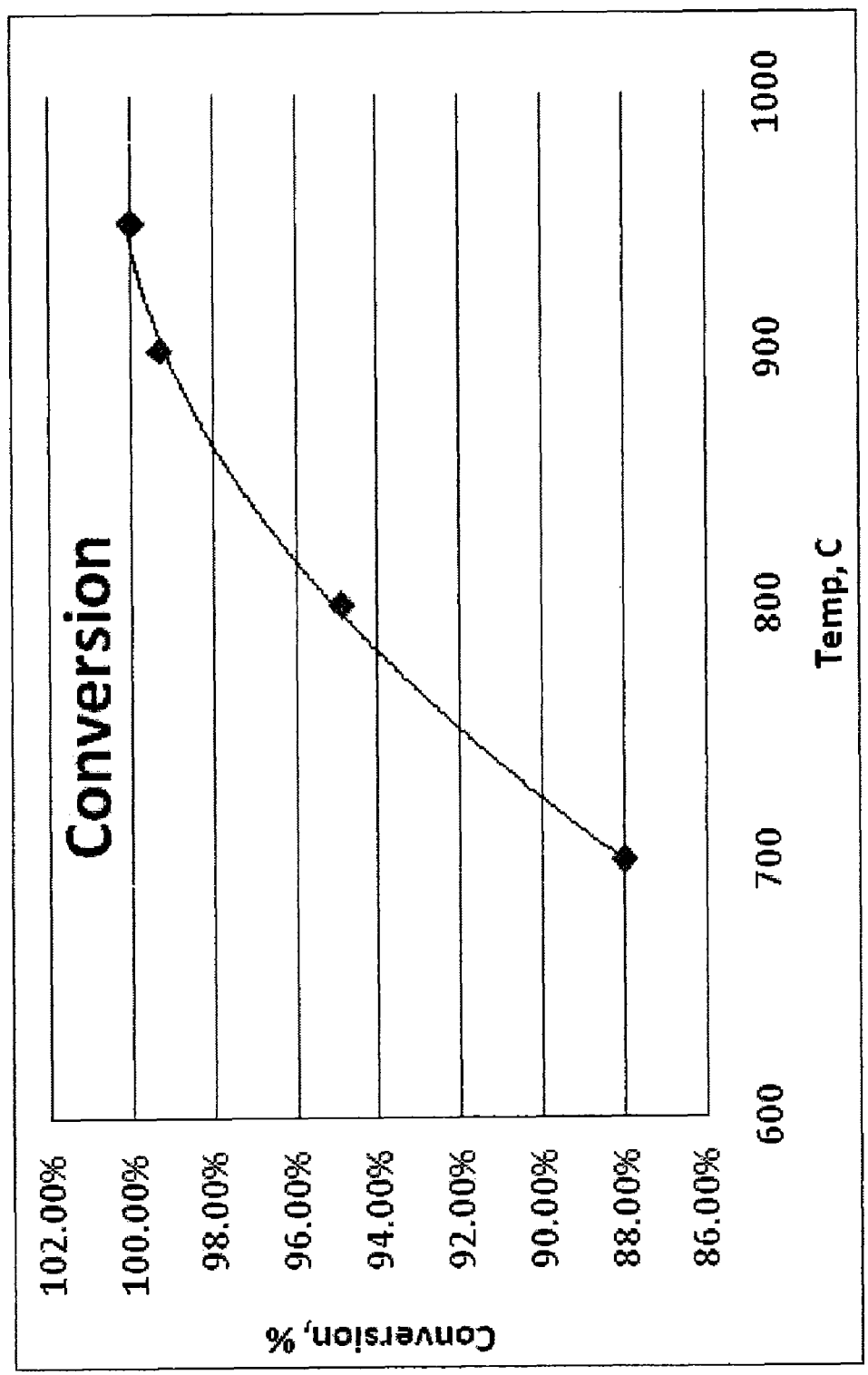
FIG. 2 is a graph illustrating the effect of temperature on conversion of a kiln byproduct according to a first embodiment of the invention.

FIG. 2 illustrates the effect of temperature on conversion of the sulfate content in the by-product composition The graph predicts that above 800° C. temperature is necessary to achieve greater than 99% conversion of aluminium, titanium and iron compounds (as a total oxidation). The residence time is also critical and reasonable. One other factor to keep in mind is that for easily soluble salts of strong acid-base, in this case sodium sulfate, the temperature of oxidation should be below the melting temperature of sodium sulfate. The decomposed sulfate gases are scrubbed and collected as sulphuric acid or oleum as described herein.

The calcination reaction of the sodium-calcium-aluminum sulfate compound may be shown by the following equations:

$$Na_aCa_bAl_c(SO_4)_d \rightarrow Na_2SO_4 + Al_2O_3 + CaSO_4 + SO_3(g) + SO_2(g) \quad (1)$$

$$SO_3(g) + H_2O = H_2SO_4(l) + oleum. \quad (2)$$

The oleum produced may be re-used in the SiF4 production process. Sulphur dioxide gas is produced in very small quantities but should be scrubbed to eliminate any environmental issues of emission. Scrubbing of the sulphur dioxide may be accomplished using a solution of aluminium hydroxide and sodium hydroxide, as shown in Equation 3 below:

$$SO_2(g) + Al_2O_3 + NaOH + H_2O \rightarrow NaHSO_3 + Al_2O_3.5SO_2 + H_2SO_3 \quad (3)$$

Figure 3:
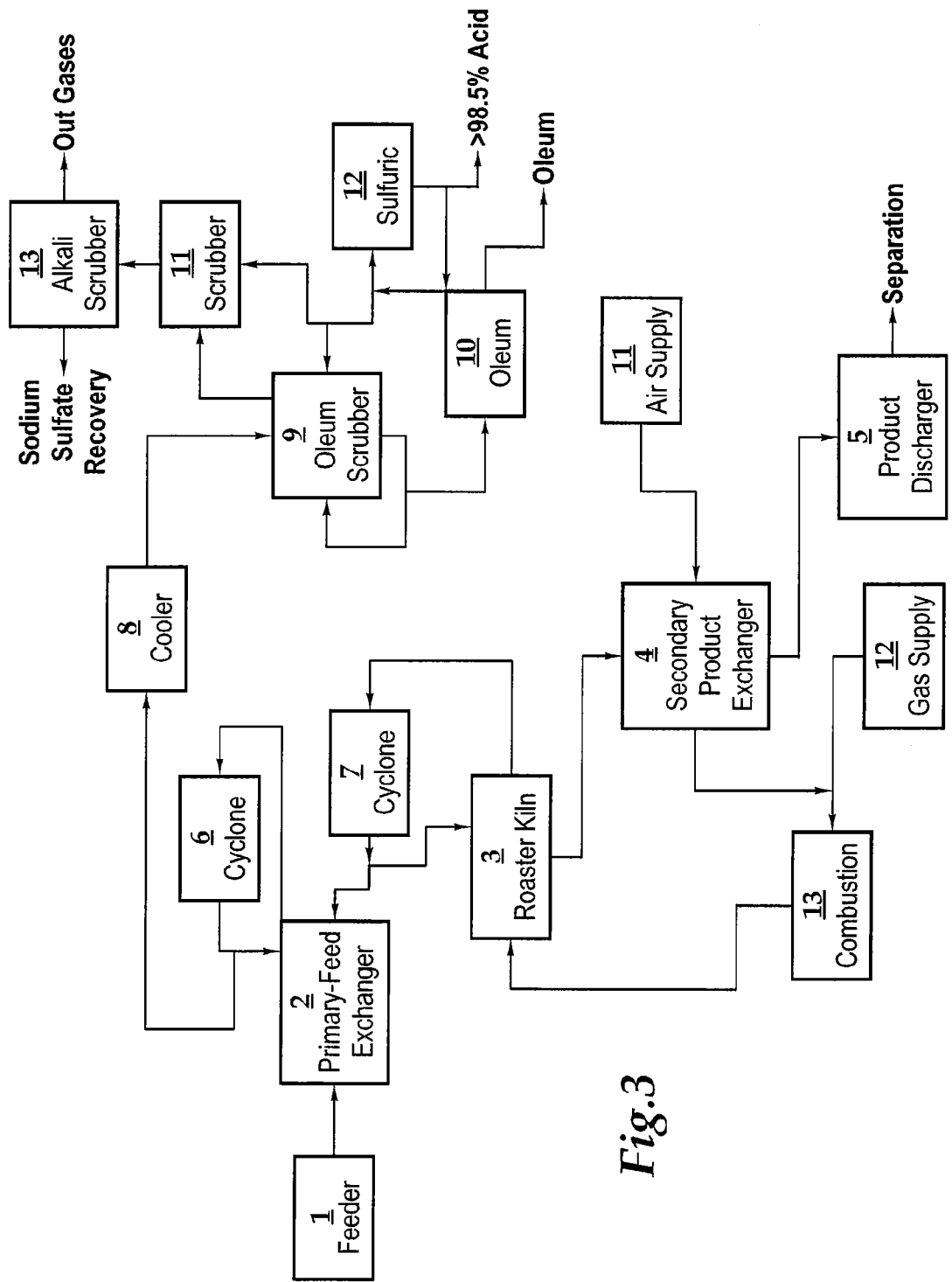
FIGS. 3 and 4, in combination, is a flow chart illustrating a method of a first embodiment of the invention.
Figure 4:
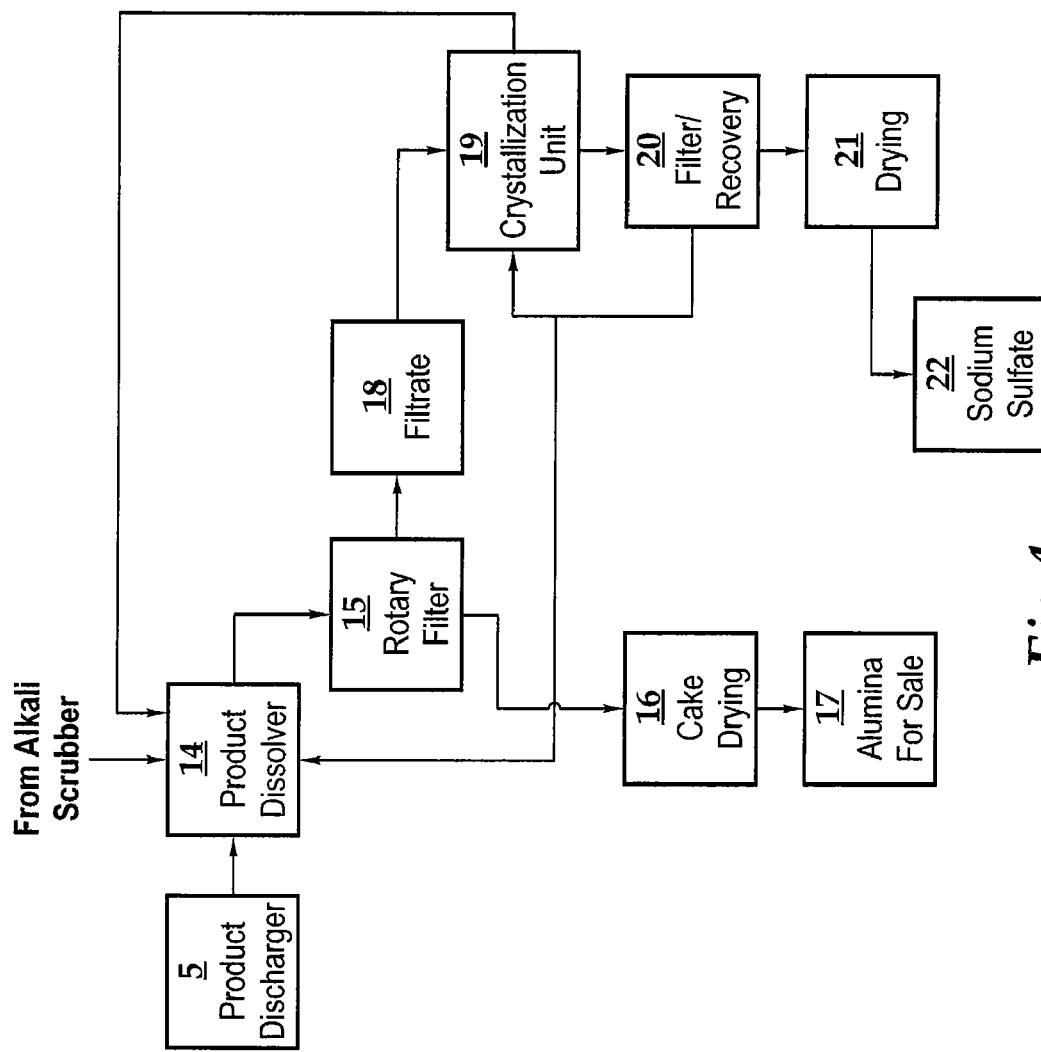

Without being bound by any particular theory, it is believed that the Alumina produced in equation (1) assists in accelerating the scrubbing of the sulphur dioxide gas by increasing the contact of the gas with the solution because of the gel formation. The scrubbed solution may then be oxidized using known methods to recover sodium sulfate and alumina. The calcination process products may be further processed as shown in FIGS. 3 and 4. The spent solution may be oxidised to obtain sodium sulfate and alumina by known methods. The mixture of sodium sulfate and alumina may then be recycled to the oxidation mixture separation system. Overall there is a total species balance without any or with minimal waste.

Example 2

A kiln byproduct mixture having the elemental composition show in Table 2 was calcined in oxygen-enriched air for 25 minutes at several temperatures of about 700° C. and greater. As used herein, "oxygen-enriched air" means air having at least 18% oxygen.

| By-product elemental composition | |
|---|---|
| O | 52.87% |
| S | 26.49% |
| Na | 9.50% |
| Al | 11.15% |

FIG. 5 is a table of the results of the calcination process. As can be seen in FIG. 5, the aluminum sulfate is significantly converted by calcinations while the sodium sulfate is unaffected. The calcination products may be further processed as discussed in connection with Example 1.

Embodiments of the invention may also be used to treat kiln byproduct compositions containing fluoride salts. Such fluoride salts may arise from the incomplete conversion of sodium tetrafluoroaluminate ($NaAlF_4$), which is one of the raw materials utilized in certain silicon tetrafluoride production processes. $NaAlF_4$ is the combination of $AlF_3$ and $NaF$. $AlF_3$ has no liquid state under atmospheric pressure; it sublimes directly from the solid state at 445° C. NaF has melting point at 993° C.

However, under calcination temperatures of between about 800° C. and 900° C., AlF3 will sublime while NaF will be unaffected until the dissolution process, used after the calcinations for separation. Above 300° C., vapor phase of AlF3 reacts with steam (moisture present in the feed source) according to the following equation:

$$2AlF3 + 3H2O \rightarrow 6HF + Al2O3. \quad (4)$$

Given the process conditions, the reaction of equation (4) occurs in the calcinator and in the vent stream the presence of HF is avoided by absorption with sulfuric acid. NaF is dissolved in water in the dissolver, collected in the crystallizer and then mixed with $Na_2SO_4$.

In some embodiments of the invention, the process of the invention is conducted with the plant design as shown in FIGS. 3 and 4.

The kiln byproduct sulphate salt mixture (including, for example, the byproduct compositions of Examples 1 and 2) is conveyed from a silicon tetrafluoride production area to a hopper (not shown) that provides for up to a twenty-four hour hold. By a rotary feeder 1 the salt mixture is preheated in exchanger 2 and then sent to a calcination kiln 3. In some embodiments, the equipment is the same or similar to that described in US20100189621, incorporated by reference earlier herein. At a minimum, the equipment should provide at least 20 minutes residence time. Calcination kiln 3 operates at less than about 1000° C. At such temperatures, calcium and sodium sulfates are not calcined while aluminum sulfate is calcined. The calcination reaction for aluminium sulfate may be expressed as in equation (5) below:

$$Al_2(SO_4)_3(S) \rightarrow Al_2O_3(S) + 3SO_3(g) \tag{5}$$

Typically, calcination of aluminium sulfate begins at about 770° C. and has a heat of reaction of about 138.73 Kcal/mol. In the most preferred embodiments, aluminum sulfate is calcined at temperatures of about 900° C. to about 950° C. so as to achieve about 100% calcination within reasonable residence times, ranging between about 10 minutes and about 2 hours. In addition, these temperatures are below the fusion temperature of sodium sulfate. About 110 kcal/kg (effective) energy is necessary in order to carry out the calcination in the inventive process and solids to be calcinated may be heated with flue gas coming from combustor 13. Exiting kiln 3 is a gaseous phase mainly composed of flue gas and $SO_3$. For every mole of byproduct sulfate salt calcined in kiln 3, three moles of $SO_3$ are formed. The gaseous stream exiting kiln 3 is sent to scrubbers 9 and 11 where it is absorbed in liquid 98% sulfuric acid and then reacted with water according to following equations:

$$H_2SO_4(l) + SO_3(g) \rightarrow SO_3.H_2SO_4(l)(oleum) \tag{6}$$

$$H_2O(l) + SO_3(g) \rightarrow H_2SO_4(l). \tag{7}$$

The amount of water necessary for this reaction is present in flue gas exiting kiln 3. If there is an excess of water it will be mixed with acid and extracted from recirculation loop.

The solid phase mixture produced in kiln 3 will typically have the following composition on a mass basis: 37.41% $Al_2O_3$; 52.08% $Na_2SO_4$ and 10.51% $CaSO_4$. This mixture should be cooled before being sent to a product dissolving mixing tank 14 where the sodium sulfate is dissolved in water. Prior to routing to the tank 14, the solid phase mixture is used to pre-heat the combustion air in exchanger 4. The sodium sulfate solubility in water is 47.6 g/l at 0° C. and 427 g/l at 100° C. It is convenient to operate the product dissolving tank 14 at about 80° C. to 90° C. to maintain the sodium sulfate in solution while preventing water vaporization. The $Na_2SO_4$ solution which also includes suspensions of $CaSO_4$ and $Al_2O_3$ is sent to a rotary filter 15 to separate sodium sulfate solution from a cake containing insolubles solids and water in a 60% solid mass fraction. The saturated solution of sodium sulfate is transferred by a pump to a crystallizer 19 while the sludge cake of alumina and calcium sulfate is transferred to a dryer 16. Calcium sulfate and alumina may be separated by balancing pH where at higher pH calcium sulfate will be separated out after digesting. Crystallizer 19 produces a stream of steam condensate which is recycled to product dissolving mixing tank 14 and a sludge which is sent to a filter/recovery system 20. Water removed from the sludge is also recycled to product dissolving mixing tank 14.

The flow rate of the byproduct sulfate salt mixture from the silicon tetrafluouride production area cannot be directly controlled. The hopper (not shown) has a 24 hour hold up in order to compensate for any solid flow variation. In stationary conditions, the level in the hopper is maintained constant by a level control acting on rotary valves positioned on the solid stream.

Since the amount of heat to be supplied to the kiln 3 is proportional to solid flow rate, the flow rates of combustion air and natural gas are controlled by the rotary valve speed. In particular the air flow is directly controlled by the rotary valve speed while natural gas is fed in constant ratio with the combustion air.

Flue gas with $SO_3$ exiting exchanger 2 entering the scrubber 9 should not have a temperature higher than 200° C. For this reason the temperature control on air cooler 8 measures the temperature of flue gas entering the scrubber and varies the position of the louvers.

Sulfuric acid is produced by reaction between water and sulfuric anhydride inside the scrubber 11. This acid exits the scrubber 11 as bottom liquid regulated by a level control on scrubber bottom. Sulfuric acid solution is the scrubbing media and its circulation guarantees the heat removal from flue gases. Then a temperature control on the scrubber packing regulates the flow rate of cooling water to exchanger 8.

A stream of steam condensate exits crystallizator 19. The crystallizer is preferably operated to maximize water recovery. The recovered water is recycled to the mixing tank 14 to assist in dissolution of calcined solids present in tank 14. Additional water may also be added to tank 14, if needed to dissolve calcined solids. Total dissolution water flow rate is preferably maintained constant by control of additional, i.e., non-recycled, water added to tank 14.

In alternative embodiment, a kiln byproduct comprising solely aluminum sulfate and sodium sulfate, alkali digestion is used to convert aluminum sulfate to an oxide-hydroxide in an aqueous reaction, as is currently known. The aluminum oxide-hydroxide is formed by the reaction of aluminum sulfate with sodium hydroxide in an aqueous reaction medium contained in a suitable reaction vessel 50 equipped with suitable agitation mechanism to achieve complete digestion. The reaction mechanism is as follows:

$$Al_2(SO_4)_3 + 6NaOH \rightarrow Al_2O_3.xH_2O(Al(OH)_3) + 3Na_2SO_4 \tag{8}$$

Figure 6:
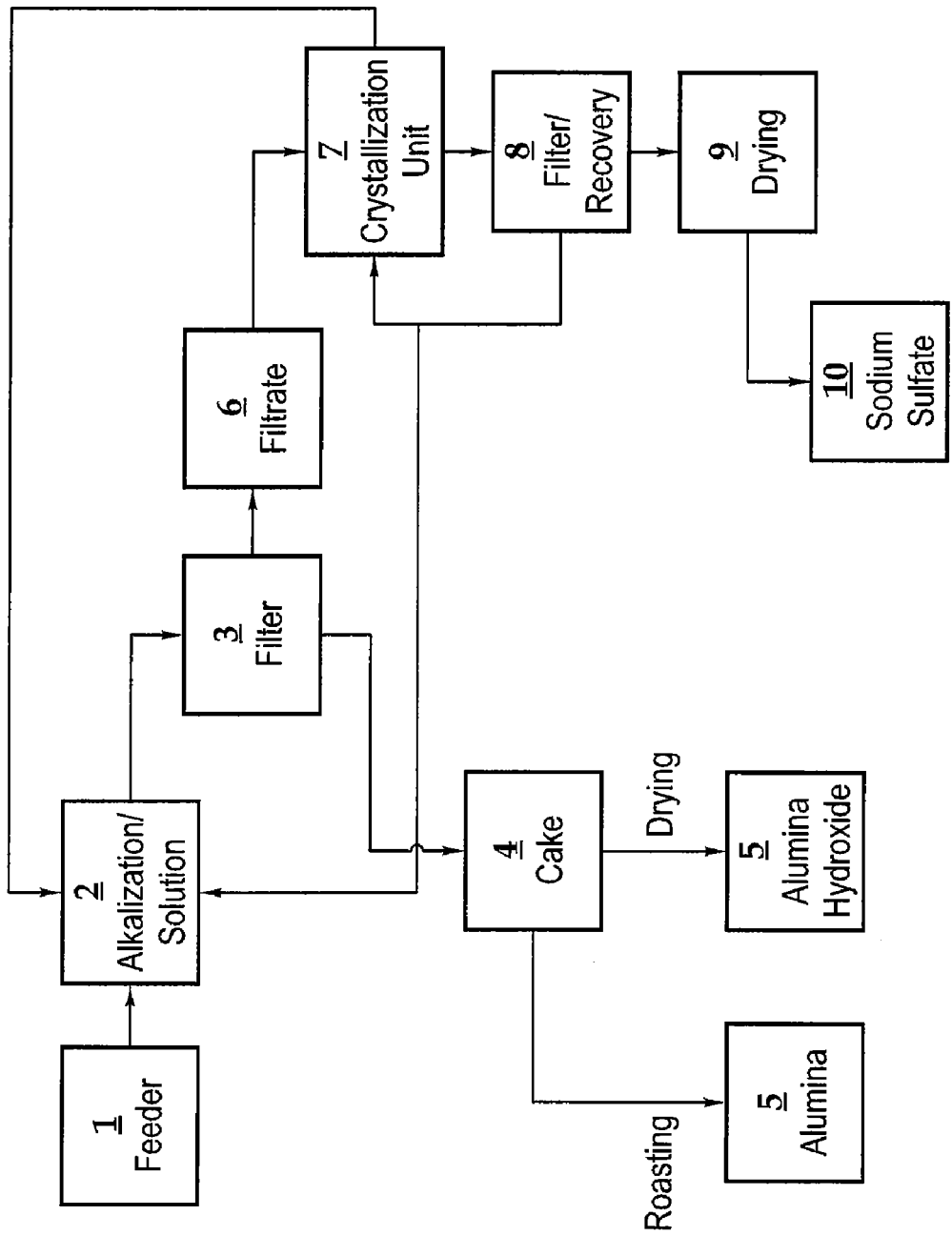
FIG. 6 is a flow chart illustrating a method of an alternative embodiment of the invention.

Under certain reaction conditions the aluminum hydroxide formed by this reaction forms a gel. Specifically, to prepare gel forming aluminum hydroxide, the pH of the aqueous solution should be greater than 8 but less than 9. In addition, contact time, in conjunction with reasonable agitation, should be between about 5 to about 15 minutes and the reaction temperature maintained between about 40° C. and about 60° C. FIG. 6 is a flow chart illustrating this alternative embodiment.

What is claimed is:
1. A process for recovering useful compounds from a byproduct composition produced in a silicon tetrafluoride production process, comprising:
   calcining a byproduct composition comprising sodium sulfate and aluminum sulfate and forming an oxidized phase mixture comprising alumina solids, and sodium sulfate and a gaseous phase comprising sulfur trioxide;
   absorbing the gaseous sulfur trioxide in a mixture of sulfuric acid and water to produce oleum;
   cooling the oxidized phase mixture to produce a cooled solid phase mixture;
   mixing the cooled solid phase mixture with water to produce a dissolved product comprising dissolved sodium sulfate and suspended alumina solids;

filtering the dissolved product to obtain a cake comprising alumina and a sodium sulfate salt solution;
crystallizing the sodium sulfate salt solution to produce steam condensate and a sodium sulfate sludge;
drying the cake to produce alumina solids; and
drying the sludge to produce a dry sodium sulfate salt.

2. The process of claim 1 wherein the byproduct composition is calcined at a temperature between about 800° C. and about 950° C.

3. The process of claim 2 wherein the cooled solid phase mixture is mixed with water at a temperature between about 80° C. and about 90° C.

4. The process of claim 1 further comprising recycling the oleum to a silicon tetrafluoride production process.

5. The process of claim 1 wherein the byproduct composition further comprises calcium sulfate.

6. The process of claim 1 wherein the dissolved product is filtered using a rotary filter.

7. The process of claim 1 wherein the byproduct composition is pre-heated prior to calcination.

8. A system for recovering alumina and sodium sulfate from a kiln byproduct in a silicon tetrafluoride production process comprising:

a hopper for receiving the kiln byproduct;
a rotary feeder for transferring the kiln byproduct to a calcination kiln, the calcination kiln operable to temperatures of about 1000° C.;
a combustor for supplying heat to the calcination kiln;
an exchanger for cooling an oxidized product from the calcination kiln and preheating air for the combustor;
a product dissolving tank for receiving the cooled oxidized product from the exchanger;
a rotary filter for separating suspended particles from an effluent of the product dissolving tank;
a crystallizer for recovering sulfate salts from a liquid effluent of the rotary filter;
a dryer for drying particulate recovered from the rotary filter; and
an oleum scrubber for receiving a gaseous product of the calcination kiln.

9. The process of claim 1 where dissolving tank contains water at a temperature between about 80° C. and about 90° C.

* * * * *